US008144937B2

(12) United States Patent
Zimmer et al.

(10) Patent No.: US 8,144,937 B2
(45) Date of Patent: Mar. 27, 2012

(54) SYSTEM AND METHOD FOR AIRPORT MAPPING DATABASE AUTOMATIC CHANGE DETECTION

(75) Inventors: Nico Zimmer, Rheinland-Pfalz (DE); Donald L. Ravenscroft, Broomfield, CO (US); William G. Lugsch, Golden, CO (US)

(73) Assignee: The Boeing Company, Chicago, IL (US)

( * ) Notice: Subject to any disclaimer, the term of this patent is extended or adjusted under 35 U.S.C. 154(b) by 833 days.

(21) Appl. No.: 12/251,819

(22) Filed: Oct. 15, 2008

(65) Prior Publication Data
US 2010/0092045 A1    Apr. 15, 2010

(51) Int. Cl.
*G06K 9/00* (2006.01)
*B64G 1/36* (2006.01)

(52) U.S. Cl. ............ 382/113; 382/209; 701/13

(58) Field of Classification Search .......... 382/100, 382/103, 106, 107, 113, 123, 155, 162, 168, 382/173, 181, 190, 206, 209, 232, 254, 268, 382/274, 275, 276, 284, 286–291, 305, 312, 382/321; 707/802; 715/788; 701/13, 16
See application file for complete search history.

(56) References Cited

U.S. PATENT DOCUMENTS

| 6,388,684 | B1 * | 5/2002 | Iwamura et al. | 715/788 |
|---|---|---|---|---|
| 6,711,479 | B1 * | 3/2004 | Staggs | 701/16 |
| 7,653,218 | B1 * | 1/2010 | Malitz et al. | 382/113 |
| 7,660,441 | B2 * | 2/2010 | Chen et al. | 382/113 |
| 7,933,929 | B1 * | 4/2011 | McClendon et al. | 707/802 |
| 8,010,245 | B2 * | 8/2011 | Nichols et al. | 701/16 |
| 2001/0038718 | A1 * | 11/2001 | Kumar et al. | 382/284 |

OTHER PUBLICATIONS

I Chen, Xiaoping, Yu Shensheng, Ma Zhilong: "Study on object recognition for satellite imagery", Proc. of SPIE vol. 6795-67952Y-1.*
Chen, Xiaoping, Yu Shensheng, Ma Zhilong: "Study on object recognition for satellite imagery", Proc of SPIE vol 6795-67952Y-1, 2007.

* cited by examiner

*Primary Examiner* — Seyed Azarian
(74) *Attorney, Agent, or Firm* — Harness, Dickey & Pierce, P.L.C.

(57) ABSTRACT

A method for automatically updating a graphical information system (GIS) type database using aerial imagery. The method may involve processing a new image to identify at least one target region therewithin; analyzing the target region to determine image invariant moments thereof; using feature vector data to generate a template of a target feature from an old image; analyzing the template to generate image invariant moments thereof; and comparing the image invariant moments of the target region with the image invariant moments of the template to identify a feature change between the target region and the template.

20 Claims, 2 Drawing Sheets

SYSTEM AND METHOD FOR AIRPORT MAPPING DATABASE AUTOMATIC CHANGE DETECTION

FIELD

The present disclosure relates to systems and methods for detecting changes in features of a geographical area, and more particularly for automatically comparing aerial images of a geographic region and automatically detecting features within the region that differ between the images.

BACKGROUND

The statements in this section merely provide background information related to the present disclosure and may not constitute prior art.

In the aviation industry it is important to periodically update maps of geographic areas such as airports and airport runways. This is to make sure that pilots have up to date charts that clearly show all the structural features (buildings, antennas, roads, etc.) that are located at or near an airport. Pilots typically rely on information provided in an airport mapping database ("AMDB") that includes maps of airports.

When the maps in an AMBD are updated to reflect changes (i.e., new features) in the maps, such updating is typically performed manually using an independent entity that specializes in providing this service. The new features are typically identified by comparing new satellite imagery of predetermined geographic areas with older satellite imagery. Ground control points ("GCPs") are often used to improve geographic accuracy of the image. A highly trained analyst (i.e., an individual) visually compares every vector feature in a given database with the corresponding raster region in the newly obtained new satellite image to detect feature changes in the scenes represented by the two satellite images. If a new or changed feature is found, it will be identified (i.e., "captured") and stored into the AMBD database. There is typically little or no automated or computer-assisted evaluation of the satellite images; the analyst is often strictly responsible for visually detecting any new features present in the latest acquired satellite image(s).

As will be appreciated, having an individual manually perform AMBD change detection typically result in an extremely human intensive, non-automated, and cost intensive process. There may also be an increased risk that a visually difficult to detect new feature may not be detected by the analyst. Manually performed AMBD updating is also typically time consuming and can sometimes take weeks to complete.

SUMMARY

In one aspect the present disclosure relates to a method for automatically updating a graphical information system (GIS) type database using aerial imagery. The method may comprise: processing a new image to identify at least one target region therewithin; analyzing the target region to determine image invariant moments thereof; using feature vector data to generate a template of a target feature from an old image; analyzing the template to generate image invariant moments thereof; and comparing the image invariant moments of the target region with the image invariant moments of the template to identify a feature change between the target region and the template.

In another aspect the present disclosure relates to a method for automatically updating an airport mapping database (AMDB) using satellite imagery. The method may comprise: processing a new satellite image to identify at least one target region therewithin; analyzing the target region to determine image invariant moments thereof; using feature vector data to generate a template of a target feature from an old image, the template generally corresponding to the target region; analyzing the template to generate image invariant moments thereof; comparing the image invariant moments of the target region with the image invariant moments of the template to identify a feature raster change between the target region and the template; and updating the AMBD with a feature vector change representative of the feature raster change.

In still another aspect the present disclosure relates to a system for automatically updating a graphical information system (GIS) type database using remote sensing (aerial, satellite, or other) imagery. The system may comprise: a database for storing vector data relating to a geographic region and features present within the geographic region; a pre-processing system for receiving a new image and identifying a target region therewithin; a processing system for obtaining feature vector data from the database and generating a template from an old image taken previous in time to the new image, the template representing a target feature being generally related in shape to the target region; an image invariant moment analyzing system for generating image invariant moments of the target region and the template; and a comparison system that compares the image invariant moments of the target region with the image invariant moments of the template and identifies feature changes between the target region and the template.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
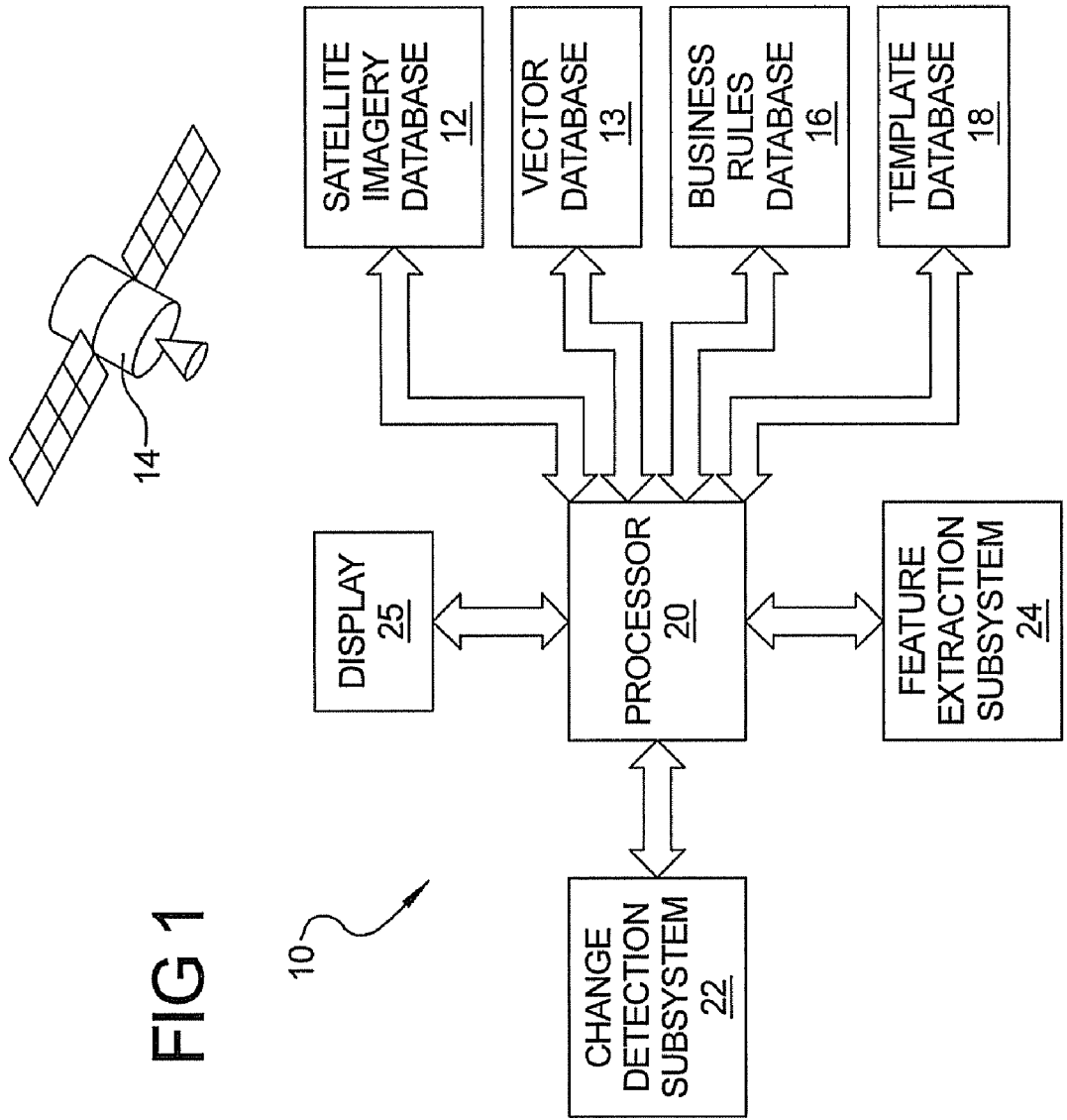
FIG. 1 is a block diagram of one embodiment of a system in accordance with the present disclosure.

The following description is merely exemplary in nature and is not intended to limit the present disclosure, application, or uses. It should be understood that throughout the drawings, corresponding reference numerals indicate like or corresponding parts and features.

Referring to FIG. 1, there is shown a system 10 for performing airport mapping database (AMBD) change detection in accordance with one embodiment of the present disclosure. The system 10 may be used to determine changes in features within predefined regions, for example changes to features at an airport. Such features may be new buildings or structures that have been erected; buildings or structures that have been removed; roads that have been added or removed; fences erected or removed, etc. However, it will be appreciated immediately that the system 10 may find utility in virtually any application where it is important or desirable to be able to detect changes in features (e.g., buildings, antennas, roads, signs, etc.) within a predetermined geographic area. Thus, while the system 10 may be especially well suited for use in creating and updating an AMBD that is used in aviation applications, significant various other uses will be found as well. For example, additional potential applications may involve finding features in marine shoreline and floating assets; large area asset management, metropolitan cadastral information; transportation networks; water features; utilities changes; rail line physical assets such as rail cars and roadbeds; aviation obstacles on the ground, and other similar applications where the assets to be examined or discovered can be seen from remote (aerial or space based) imagery. It will also be appreciated that while the present system 10 involves the use of an AMBD, that any graphical information system (GIS) type database could be used in the present system 10.

The system 10 may include a satellite imagery database 12 that is used to store satellite imagery down-linked from one or more orbiting satellites 14. The satellite imagery includes not only digital pixel information of the satellite image that is stored but other information such as the angle that a given image was taken at relative to the Earth's surface, satellite ephemeris, sun azimuth, satellite platform orientation and atmospheric conditions. A vector database 13 is used to store previously generated feature vector information pertaining to various known features of a location or area, such as feature vectors concerning a runway at a specific airport. A business rules database 16 is used to store rules concerning the interpretation of the satellite imagery information that helps to discern various features within a satellite image that one may wish to focus on. For example, one business rule may be that a line of pixels representing a certain length is to be construed as representing a portion of an airport runway. Other possible rules include shape, capture, physical description, and classification and type.

A template database 18 is used to store templates that are used during a subsequently performed comparison and feature detection operation. Each template stored within the database 18 represents a feature defined by vector data that is obtained from previously obtained satellite imagery. For example, vector data may be used to define a taxiway at an airport, or a specific building at an airport, a freeway adjacent to a runway, or virtually any other feature that may be pertinent within a geographic area represented by the satellite imagery. A template is formed by using the desired vector data to essentially "cut out" a section of satellite imagery from a larger collection of digital satellite imagery data so that only a desired, limited subset of the satellite imagery information representing a desired feature is provided. The unused portion of the satellite imagery may be thought of as the "background", and the desired portion forms the template. In practice, the template database 18 may hold hundreds or even thousands of templates of a wide variety of natural geographic features (i.e., trees, hills, water) as well as man made features such as buildings, antenna structures, power lines, etc.

A processor 20 is used to obtain satellite imagery information, information from the business rules database 16 and the template database 18, and to assist other subsystems in carrying out feature comparison and extraction operations. As will be described further in the following paragraphs, a change detection subsystem 22 uses image invariant moments of the template and also of a target region of new satellite imagery for a scene to identify differences (i.e., feature differences) between the template and the target region. A suitable algorithm may be used to assist in performing the image invariant moment analysis of the template and the target region. A feature extraction subsystem 24 uses the results of the image invariant moment analysis performed by the change detection subsystem 22 to extract the digital data representing the feature difference or differences between the template and the target region. These differences may be displayed on a display terminal 25 for an analyst to view if needed. It will be appreciated that while the processor 20, the change detection subsystem 22 and the feature extraction subsystem 24 are illustrated as separate subsystems in FIG. 1, that they may just as readily be integrated in a single large processing system. However, the representation of these subsystems as separate items assists in understanding the operation of the system 10.

As mentioned above, image invariant moments are used to describe the template and the target region. Image invariant moments are a well known technique used in image processing and computer visualization systems. Image invariant moments for each template and target region can be viewed as particular weighted averages (i.e., moments) of the pixel characteristics such as image intensity of each pixel of information. The image invariant moments may be chosen to have some desirable property or interpretation. For example, image invariants properties can be chosen as a measure of the area (reflectivity), the centroid, and orientation of the moment that can be used in subsequent comparisons.

The change detection subsystem 22 may define a similarity measurement. The similarity moment may comprise, for example, the Euclidean distance between image invariant moments of the template and the target region that is used to mathematically detect a feature difference between the template and the target region.

Figure 2:
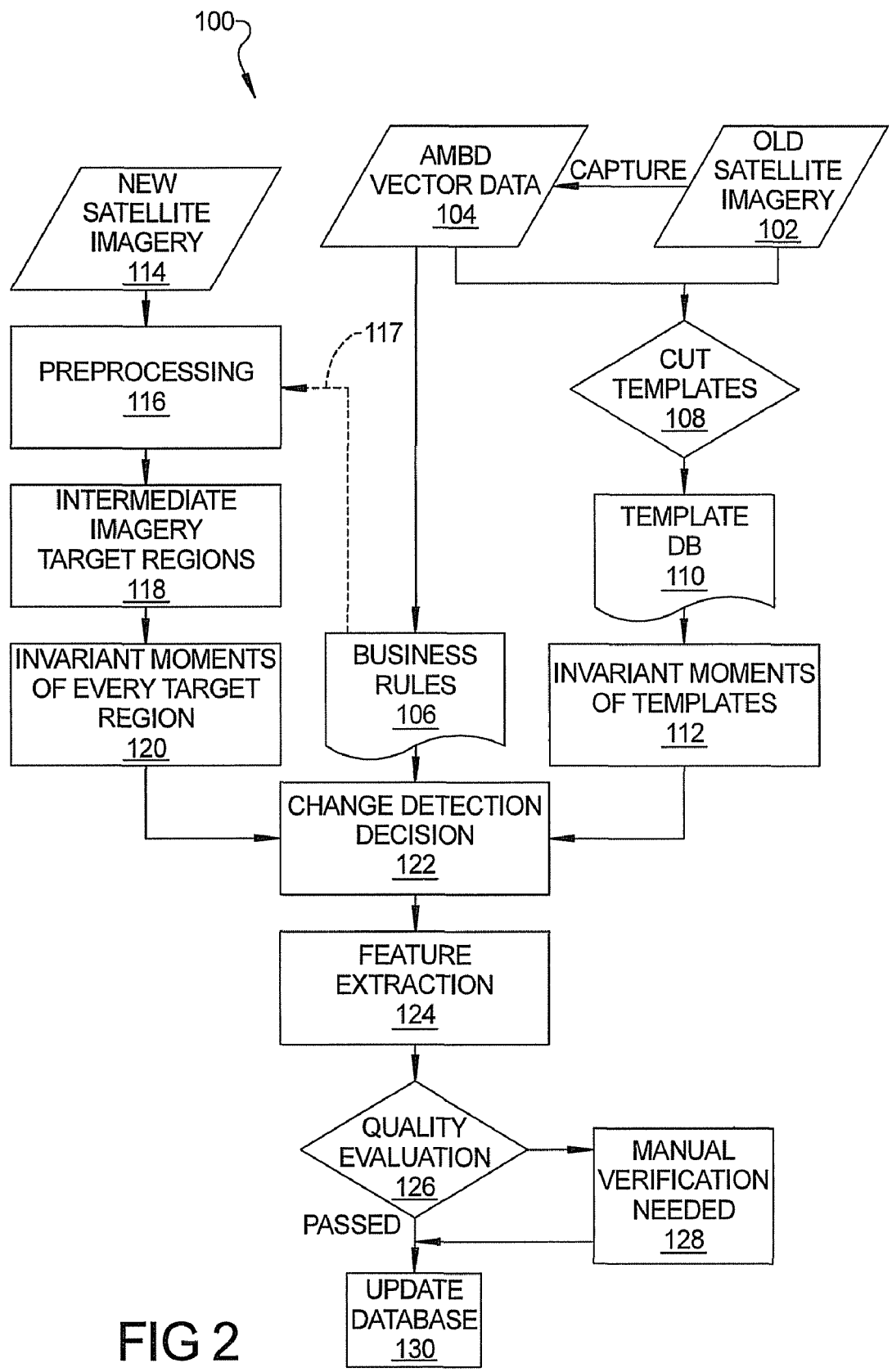
FIG. 2 is a flowchart setting forth operations performed by the system of FIG. 1 in detecting feature raster changes between the two satellite images.

Referring now to FIG. 2, a flowchart 100 is shown that sets forth operations performed by the system 10 in detecting feature changes between a target region and a template. At operation 102 preexisting satellite imagery stored in the satellite imagery database 12 is obtained that includes a predefined geographic area, for example an entire airport. At operation 104 vector data that describes a known feature of the predefined geographic area, for example a runway, is obtained from the business rules database 16 as indicated at operation 106. At operation 108 the vector data and the preexisting satellite imagery are used by the processor 20 to produce at least one "cut" template, as indicated at operation 106. By "cut" it is meant a template that was formed from a pertinent portion of a larger collection of satellite imagery. In this example the cut template may represent an airport runway. The vector data used in forming the template is obtained from the business rules database 16 and represents that vector data that describes the pertinent feature (e.g., runway), in vector form, that one wishes to analyze in the preexisting satellite imagery. At operation 108 the template may be stored in the template database 110 for future use so as to speed up processing during a subsequently performed feature analysis/detection operation. At operation 112 the change detection subsystem 22 generates image invariant moments that represent the digital information forming the template.

Concurrently with operations 102-112, the system 10 acquires new satellite imagery from the satellite imagery database 12 at operation 114. The new satellite imagery may be newly obtained (i.e., more recent) satellite imagery that represents the same predefined geographic area as that used at operation 102. A preprocessing operation may be performed at operation 116 using normalized difference vegetation index (NDVI) information to define the background or use of Fuzzy Logic features to determine the region of interest. The preprocessing operation 116 may also use rules from the business rules database 16, as indicated by dashed line 117, as well as feature vector data from the vector database 13, to create the target region, as indicated at operation 118. The change detection subsystem 22 then uses the information from the databases 16 and 13 to generate image invariant moments for the digital data representing the target region, as indicated at operation 120. Thus, one group of image invariant moments exists for the template while a second group of image invariant moments exists for the target region.

At operation 122 the change detection subsystem 22 uses the image invariant moments generated at operations 112 and 120 to perform a comparison to detect differences between the two that indicate a feature raster change. This comparison may be performed by calculating the Euclidean distance between the image invariant moments and may make use of business rules stored in the business rules database 16. The business rules differentiate conditions such as spectral, geometric, and contextual characteristics that can be used to detect feature raster change. The feature raster change can be thought of as the change represented by the pixels, or groups of pixels, in both groups of the image invariant moments, that define the detected feature vector change in pixel form.

At operation 124 the feature extraction subsystem 24 uses the results of the comparison to extract the information that represents a feature vector change in the target region. As such, the feature raster change information is used to generate the vector change data during the extraction process in operation 124. The feature vector change may be the addition of some feature, for example a topographical feature such as a berm or hill that was not present in the template, or possibly the addition of a structural feature such as a fence or building. The extracted feature may then be saved as a feature vector in the template database 18, saved in the vector database 13 and/or used to generate the extracted feature that is displayed on the display 25. Alternatively the feature extraction subsystem 24 may identify a feature in the template that is no longer present in the target region. Any feature difference present between the target region and the template will be identified.

At operation 126 an automated quality evaluation may be performed by the processor 20 and the feature comparison subsystem 22 to verify that the extracted feature meets prescribed standards of accuracy (e.g. 3 meter accuracy at 95% confidence) in resolution and the change. The quality evaluation may also be used to verify that the extracted feature in fact represents an accurate representation of the detected feature raster change between the target region and the template. If the difference between the newly extracted feature is too large than examination for accuracy may be needed. Alternatively, the quality evaluation may involve a manual (i.e., visual) inspection of the preexisting satellite imagery and the newer satellite imagery by an experienced analyst to verify that the extracted feature in fact accurately represents a true feature raster change. Any quality changes needed may be implemented at operation 128. If no quality changes are needed or manual quality changes are implemented in operation 128, then such may be indicated at operation 130.

The system 10 and method of the present disclosure enables AMDB automatic feature change detection to be implemented, which is expected to significantly reduce the manually intensive work that otherwise is needed to identify feature raster changes between satellite imagery. The system 10 and method may in some instances significantly reduce the time needed to identify and extract feature raster changes in satellite imagery from days or weeks to merely hours, or potentially even just minutes. The overall cost of analyzing and extracting feature raster changes from satellite imagery is also expected to be considerably less than that which would be required if a human analyst is used to manually analyze satellite imagery.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method for automatically updating a graphical information system (GIS) type database using aerial imagery, the method comprising:
    processing a new image to identify at least one target region therewithin;
    analyzing said target region to determine image invariant moments thereof;
    using feature vector data to generate a template of a target feature from an old image;
    analyzing said template to generate image invariant moments thereof; and
    comparing said image invariant moments of said target region with said image invariant moments of said template to identify a feature change between said target region and said template.

2. The method of claim 1, wherein said comparing said image invariant moments of said target region with said image invariant moments of said template to identify a feature change comprises identifying a feature vector change, from which a feature raster change between said target region and said template is produced.

3. The method of claim 2, wherein said comparing said image invariant moments of said target region and said image invariant moments of said template comprises applying a rule set to assist in identifying said feature vector change.

4. The method of claim 2, further comprising updating said database to include said identified feature raster change.

5. The method of claim 2, further comprising making a visual inspection of said new and old images to confirm said feature raster change.

6. The method of claim 1, wherein said comparing said image invariant moments of said target region with said image invariant moments of said template to identify said feature vector change between said target region and said template comprises determining a similarity measurement that assists in identifying said feature vector change.

7. The method of claim 6, wherein said determining a similarity measurement comprises determining a Euclidean distance between the two image invariant moments.

8. The method of claim 1, wherein said processing a new image to identify at least one target region therewithin comprises using image invariant moments to describe a shape of said target feature, and separating said target feature from a remainder of said new image.

9. The method of claim 1, wherein:
    said processing a new image comprises processing a new satellite image; and
    wherein said generating a template of a target feature from an old image comprises generating a template of a target feature from an old satellite image.

10. The method of claim 1, further comprising storing said template in a database prior to comparing said image invariant moments of said template and said target feature.

11. A method for automatically updating an airport mapping database (AMDB) using satellite imagery, the method comprising:
processing a new satellite image to identify at least one target region therewithin;
analyzing said target region to determine image invariant moments thereof;
using feature vector data to generate a template of a target feature from an old image, said template generally corresponding to said target region;
analyzing said template to generate image invariant moments thereof;
comparing said image invariant moments of said target region with said image invariant moments of said template to identify a feature raster change between said target region and said template; and
updating said AMBD with a feature vector change representative of said feature raster change.

12. The method of claim 11, wherein said comparing said image invariant moments of said target region with said image invariant moments of said template to identify a feature raster change between said target region and said template comprises determining a similarity measurement that assists in identifying said feature raster change.

13. The method of claim 12, wherein said determining a similarity measurement comprises determining a Euclidean distance between the two image invariant moments.

14. The method of claim 11, wherein said comparing said image invariant moments of said target region and said image invariant moments of said template comprises applying a rule set to assist in identifying said feature raster change.

15. The method of claim 11, further comprising making a visual inspection of said new and old satellite images to confirm said feature raster change.

16. The method of claim 11, further comprising storing said template in a database prior to comparing said image invariant moments of said template and said target feature.

17. The method of claim 11, wherein said processing a new satellite image to identify at least one target region therewithin comprises processing a new satellite image to separate at least one target region from a background region.

18. A system for automatically updating a graphical information system (GIS) type database using remote sensing imagery, the system comprising:
a database for storing vector data relating to a geographic region and features present within said geographic region;
a pre-processing system for receiving a new image and identifying a target region therewithin;
a processing system for obtaining feature vector data from said database and generating a template from an old image taken previous in time to said new image, said template representing a target feature being generally related in shape to said target region;
an image invariant moment analyzing system for generating image invariant moments of said target region and said template;
a comparison system that compares said image invariant moments of said target region with said image invariant moments of said template and identifies feature changes between said target region and said template.

19. The system of claim 18, wherein said graphical information type database comprises an airport mapping database (AMDB).

20. The system of claim 18, wherein said new and old images each comprise satellite images.

\* \* \* \* \*